United States Patent
Wait et al.

(10) Patent No.: US 9,697,436 B2
(45) Date of Patent: Jul. 4, 2017

(54) METHOD FOR SELECTING AN IMAGE OF AN APPLIANCE WITH A SUITABLE POSITION OR ORIENTATION OF A DOOR OF THE APPLIANCE

(71) Applicant: General Electric Company, Schenectady, NY (US)

(72) Inventors: Keith Wesley Wait, Louisville, KY (US); William Everette Gardner, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 230 days.

(21) Appl. No.: 14/598,260

(22) Filed: Jan. 16, 2015

(65) Prior Publication Data

US 2016/0210510 A1 Jul. 21, 2016

(51) Int. Cl.
| | | |
|---|---|---|
| *G06K 9/00* | (2006.01) | |
| *G06K 9/62* | (2006.01) | |
| *G06K 9/46* | (2006.01) | |
| *F25D 29/00* | (2006.01) | |

(52) U.S. Cl.
CPC ......... *G06K 9/6202* (2013.01); *G06K 9/4652* (2013.01); *F25D 29/00* (2013.01)

(58) Field of Classification Search
None
See application file for complete search history.

(56) References Cited

U.S. PATENT DOCUMENTS

| | | | | |
|---|---|---|---|---|
| 8,009,864 | B2* | 8/2011 | Linaker | G06K 9/00664 235/385 |
| 2003/0164754 | A1* | 9/2003 | Roseen | F25D 25/00 340/309.16 |
| 2014/0168396 | A1* | 6/2014 | Kempiak | H04N 7/18 348/61 |
| 2014/0297487 | A1* | 10/2014 | Bashkin | G06Q 10/087 705/28 |
| 2015/0363912 | A1* | 12/2015 | Elliott | H04N 9/045 348/277 |

FOREIGN PATENT DOCUMENTS

JP 2004215133 A 7/2004

* cited by examiner

*Primary Examiner* — Nancy Bitar
(74) *Attorney, Agent, or Firm* — Dority & Manning, P.A.

(57) ABSTRACT

A method for selecting an image of an appliance with a suitable position or orientation of a door of the appliance is provided. The method includes obtaining a digital RGB image from a camera of the appliance and converting the digital RGB image to a device independent color space in order to generate at least one of a first chromatic primary plane image or a second chromatic primary plane image from the digital RGB image. The method also includes comparing the first or second chromatic primary plane images to a reference image.

11 Claims, 7 Drawing Sheets

METHOD FOR SELECTING AN IMAGE OF AN APPLIANCE WITH A SUITABLE POSITION OR ORIENTATION OF A DOOR OF THE APPLIANCE

FIELD OF THE INVENTION

The present subject matter relates generally to appliances with cameras and methods for selecting suitable images from cameras of appliances.

BACKGROUND OF THE INVENTION

Refrigerator appliances generally include a cabinet that defines a chilled chamber. A user can place food items within the chilled chamber in order to hinder perishing of such food items. Thereby, a useable life of perishable food items can be increased.

Over time, a large volume of food items can accumulate within the refrigerator's chilled chamber. As food items accumulate, refrigerator appliance users can have difficulty identifying food items located within the refrigerator appliance or determining a quantity of certain food items within the refrigerator appliance. Consequently, the users may purchase replacement or additional food items despite already having such food items or a sufficient amount of such food items. In particular, certain food items do not readily perish within the chilled chamber, and such food items may be consumed infrequently. Thus, such food items can remain within the chilled chamber for extended periods of time. The users can forget about such food items and purchase replacements despite already having acceptable items. In such manner, the users can be inconvenienced or expend money needlessly.

Accordingly, a refrigerator appliance with features for assisting a user with viewing contents of a chilled chamber of the refrigerator appliance would be useful. In particular, a refrigerator appliance with features for assisting a user with viewing contents of a chilled chamber of the refrigerator appliance in order to establish an inventory of food items positioned within the chilled chamber would be useful.

BRIEF DESCRIPTION OF THE INVENTION

The present subject matter provides a method for selecting an image of an appliance with a suitable position or orientation of a door of the appliance. The method includes obtaining a digital RGB image from a camera of the appliance and converting the digital RGB image to a device independent color space in order to generate at least one of a first chromatic primary plane image or a second chromatic primary plane image from the digital RGB image. The method also includes comparing the first or second chromatic primary plane images to a reference image. Additional aspects and advantages of the invention will be set forth in part in the following description, or may be apparent from the description, or may be learned through practice of the invention.

In a first exemplary embodiment, a method for selecting an image of an appliance with a suitable position or orientation of a door of the appliance is provided. The method includes opening the door of the appliance and obtaining a digital RGB image from a camera of the appliance during the step of opening. The camera is positioned on the door of the appliance. The digital RGB image includes a plurality of optical fiducials positioned on the appliance. The method also includes converting the digital RGB image from the step of obtaining to a Lab color space in order to generate at least one of an A plane image or a B plane image from the digital RGB image, calculating a normalized cross-correlation between a portion of the A or B plane images from the step of converting and a portion of a reference image, and saving the digital RGB image from the step of obtaining if a normalized cross-correlation factor from the step of calculating is greater than a predetermined value.

In a second exemplary embodiment, a method for selecting an image of an appliance with a suitable position or orientation of a door of the appliance is provided. The method includes opening the door of the appliance and obtaining a plurality of digital RGB images from a camera of the appliance during the step of opening. The camera is positioned on the door of the appliance. At least one digital RGB image of plurality of digital RGB images includes a plurality of optical fiducials positioned on the appliance. The method also includes converting each digital RGB image of the plurality of digital RGB images from the step of obtaining to a device independent color space in order to generate a first chromatic primary plane image or a second chromatic primary plane image from each digital RGB image of the plurality of digital RGB images, calculating a normalized cross-correlation between a portion of the first or second chromatic primary plane images from the step of converting and a portion of a reference image, and selecting a particular one of the plurality of digital RGB images. The particular one of the plurality of digital RGB images has a normalized cross-correlation factor from the step of calculating that is greater than a predetermined value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
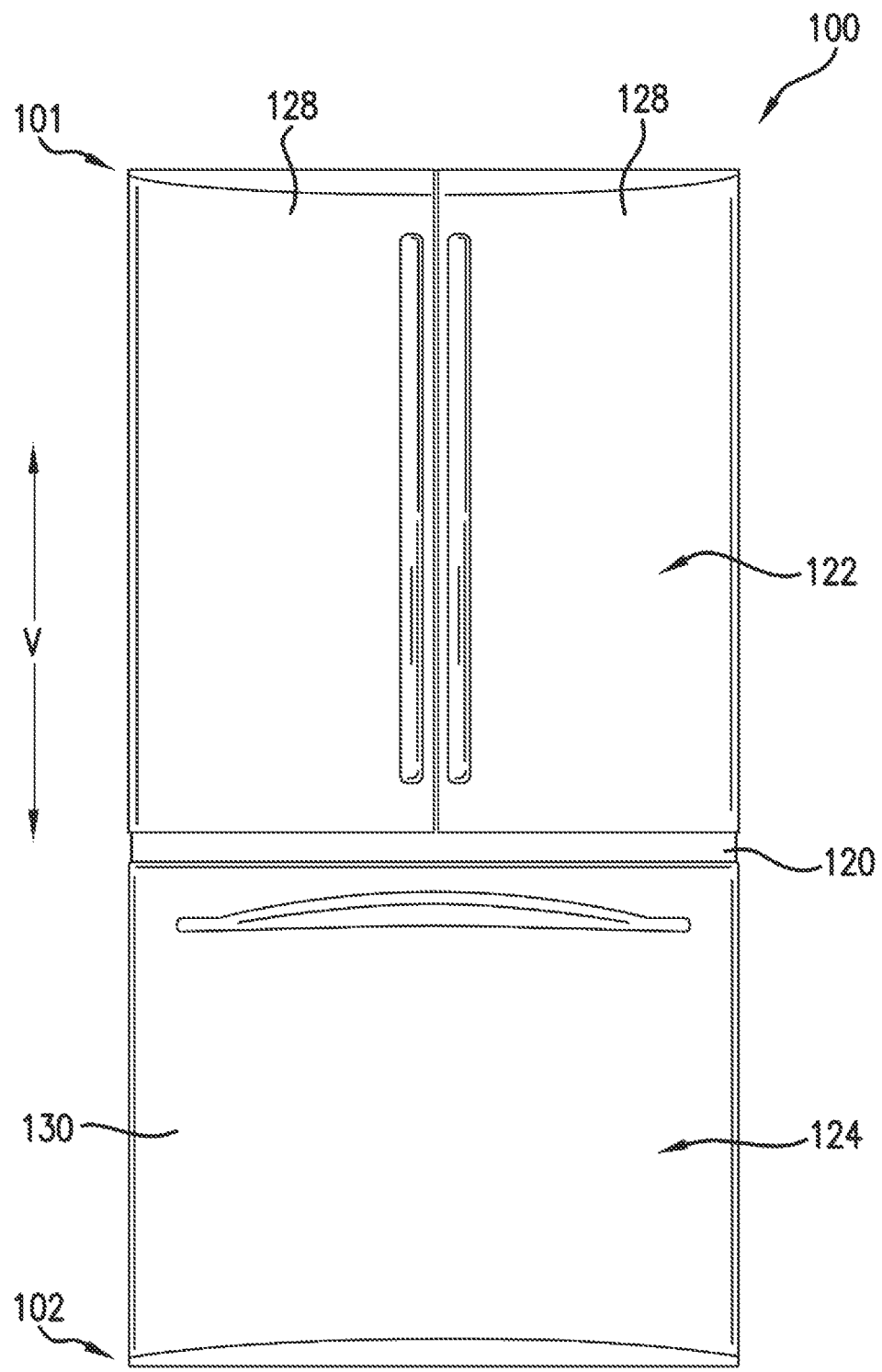
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
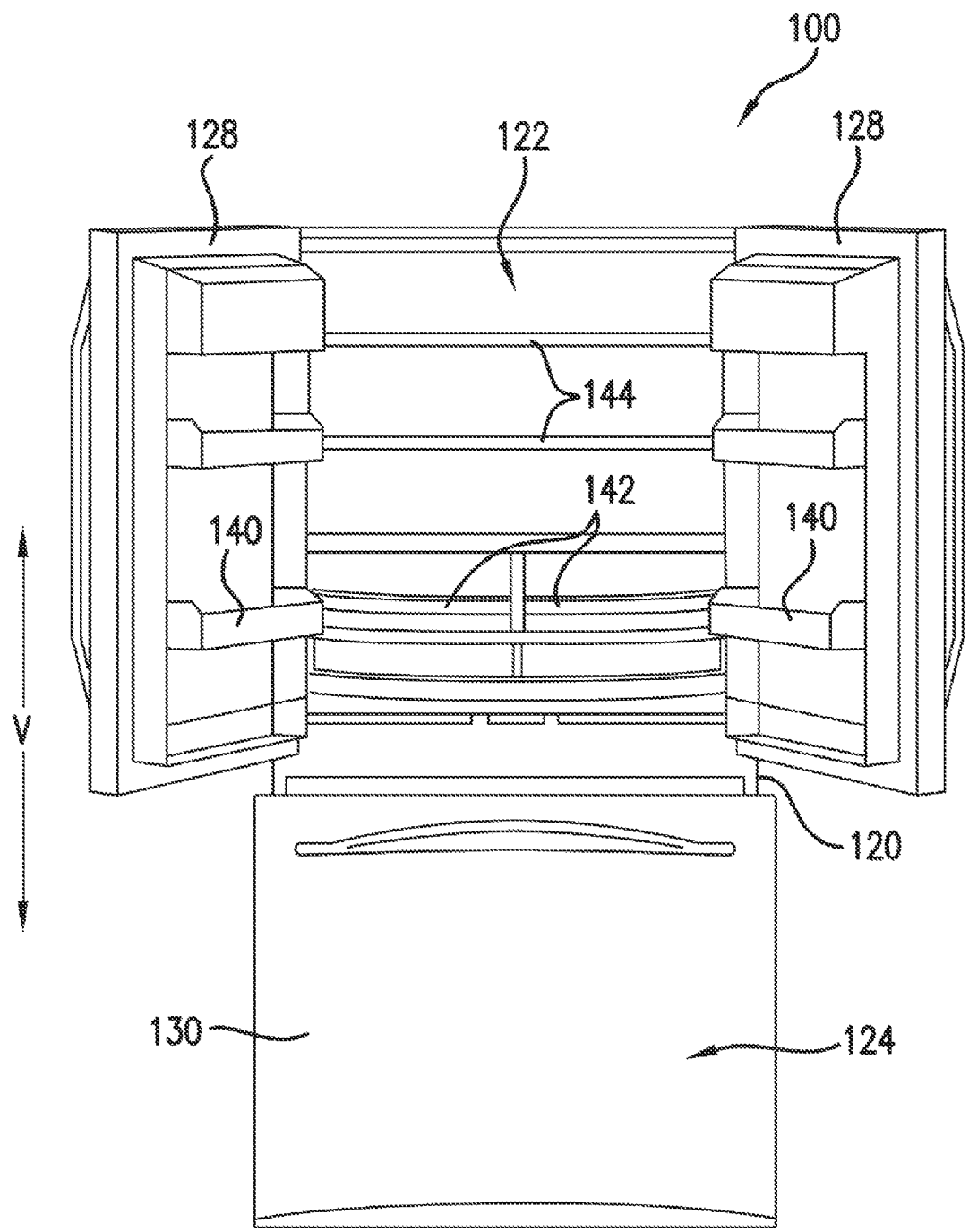
FIG. 2 provides a front, elevation view of the exemplary refrigerator appliance of FIG. 1 with refrigerator doors of the exemplary refrigerator appliance shown in an open position to reveal a fresh food chamber of the exemplary refrigerator appliance.

FIG. 1 provides a front, elevation view of a refrigerator appliance 100 according to an exemplary embodiment of the present subject matter with refrigerator doors 128 of refrigerator appliance 100 shown in a closed position. FIG. 2 provides a front view of refrigerator appliance 100 with refrigerator doors 128 shown in an open position to reveal a fresh food chamber 122 of refrigerator appliance 100. As may be seen in FIGS. 1 and 2, refrigerator appliance 100 defines a vertical direction V.

Refrigerator appliance 100 also includes a cabinet or housing 120 that extends between a top portion 101 and a bottom portion 102, e.g., along the vertical direction V. Housing 120 defines chilled chambers for receipt of food items for storage. In particular, housing 120 defines fresh food chamber 122 positioned at or adjacent top portion 101 of housing 120 and a freezer chamber 124 arranged at or adjacent bottom portion 102 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration. In addition, it should be understood that the present subject matter may be used with any other suitable appliance, such as a freezer appliance, etc.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of food items (e.g., beverages and/or solid food items) and may assist with organizing such food items. As an example, drawers 142 can receive fresh food items (e.g., vegetables, fruits, and/or cheeses) and increase the useful life of such fresh food items.

Refrigerator appliance 100 may also include features for assisting a user with identifying food items positioned within fresh food chamber 122 and/or freezer chamber 124. The user can utilize such features, e.g., to view food items stored within fresh food chamber 122 and/or freezer chamber 124 or create an inventory of such food items. Such features are discussed in greater detail below.

Figure 3:
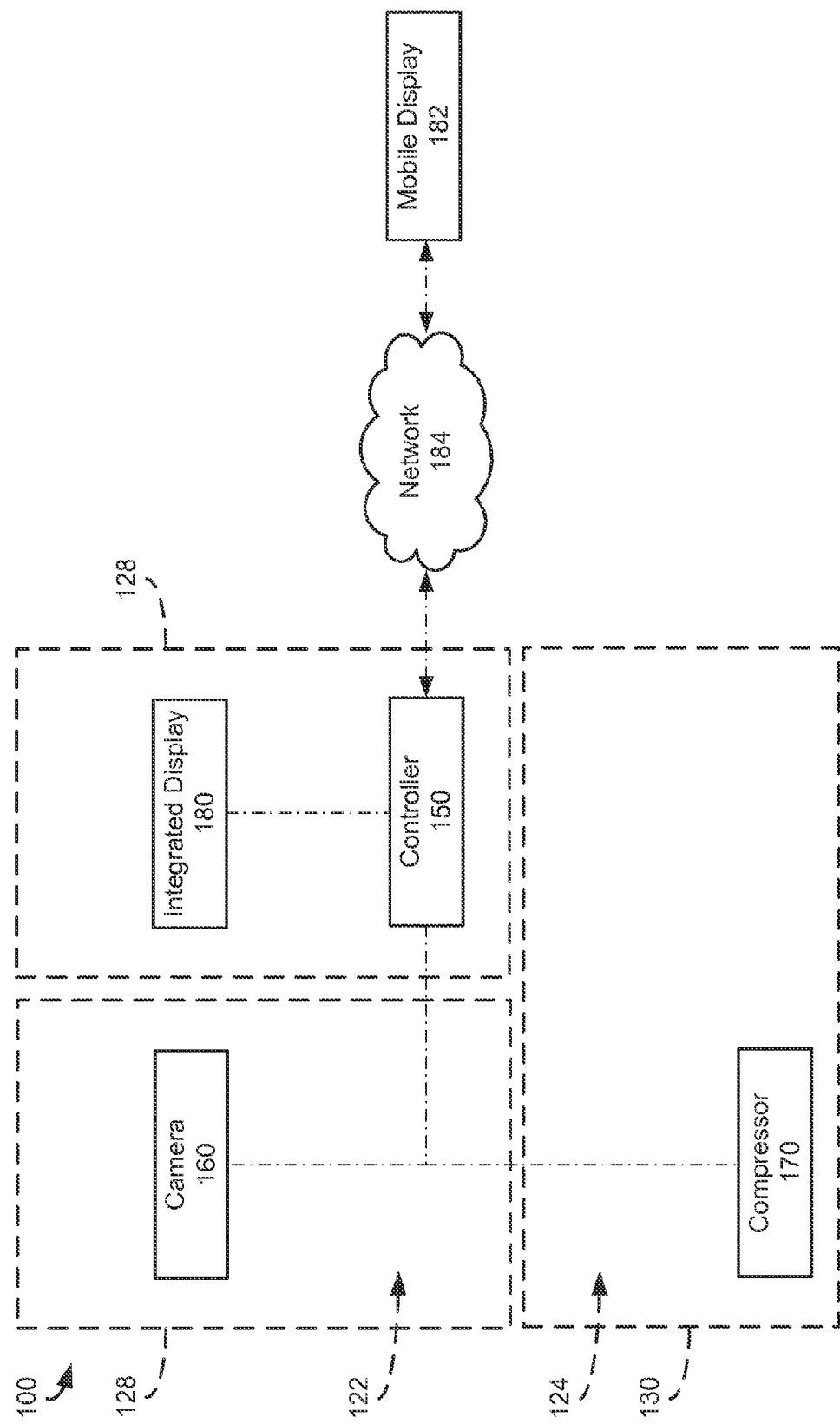
FIG. 3 provides a schematic view of certain components of the exemplary refrigerator appliance of FIG. 1.

FIG. 3 provides a schematic view of certain components of refrigerator appliance 100. As may be seen in FIG. 3, refrigerator appliance 100 includes a computing device or controller 150. Controller 150 is operatively coupled or in communication with various components of a refrigeration system (not shown) of refrigerator appliance 100 that is configured for cooling fresh food chamber 122 and/or freezer chamber 124. The components include a compressor 170, an evaporator (not shown), a condenser (not shown), etc. Controller 150 can selectively operate compressor 170 in order to supply refrigerant to the evaporator and the condenser of the refrigeration system and cool fresh food chamber 122 and/or freezer chamber 124.

Controller 150 may be positioned in a variety of locations throughout refrigerator appliance 100. For example, as shown in FIG. 3, controller 150 may be disposed in one of refrigerator doors 128. Input/output ("I/O") signals may be routed between controller 150 and various operational components of refrigerator appliance 100. The components of refrigerator appliance 100 may be in communication with controller 150 via one or more signal lines or shared communication busses.

Figure 8:
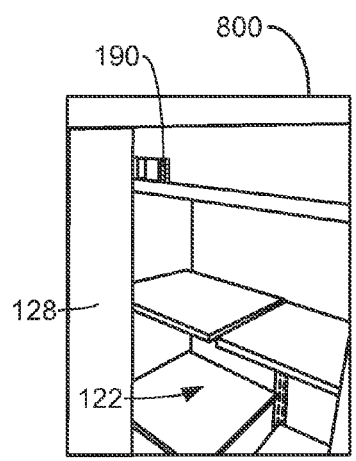
FIG. 8 provides another image of the fresh food chamber of the exemplary refrigerator appliance of FIG. 2 taken with the camera of the exemplary refrigerator appliance.

Refrigerator appliance 100 also includes a camera 160. Camera 160 may be any type of device suitable for capturing a picture or image, such as image 500 (FIG. 5) and/or image 800 (FIG. 8). As an example, camera 160 may be a video camera or a digital camera with an electronic image sensor, e.g., a charge coupled device (CCD) or a CMOS sensor. In certain exemplary embodiments, camera 160 may be a wide-angle lens VGA resolution video camera. Camera 160 is in communication with controller 150 such that controller 150 may receive a signal from camera 160 corresponding to the image captured by camera 160.

Camera 160 may be positioned at any suitable location on or within refrigerator appliance 100. For example, camera 160 may be positioned on refrigerator doors 128 and directed towards fresh food chamber 122 such that camera 160 captures pictures of fresh food chamber 122, as shown in FIG. 3. In particular, camera 160 may be directed towards any particular one of or combination of bins 140, drawers 142, and shelves 144 (FIG. 2). Thus, camera 160 can capture pictures of one of bins 140, all of bins 140, one of drawers 142, all of drawers 142, one of shelves 144, all of shelves 144, or any suitable combination thereof. A plurality of cameras may be provided to capture a picture of the entire fresh food chamber 122.

Refrigerator appliance 100 also includes an integrated display 180. Integrated display 180 may be mounted on refrigerator door 128 or at any other suitable location on refrigerator appliance 100. Integrated display 180 is in communication with controller 150 such that integrated display 180 may receive a signal from controller 150 corresponding to an image captured by camera 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image, e.g., a projector.

Refrigerator appliance 100 also includes a network interface 186 that couples refrigerator appliance 100, e.g., controller 150, to a network 184 such that refrigerator appliance 100 can transmit and receive information over network 184. Network 184 can be any wired or wireless network such as a WAN, LAN, and/or HAN.

Refrigerator appliance 100, e.g., controller 150, is in communication with a mobile display 182 via network 184. Mobile display 182 can be any device configured to communicate over network 184 and display images received therefrom. For example, mobile display 182 may be a computer, a smartphone, a tablet, etc. Mobile display 182 is in communication with controller 150 such that mobile display 182 may receive a signal from controller 150 (via network 184) corresponding to an image captured by camera 160. Mobile display 182 can receive such signal from controller 150 and present the image to a user visually. Like integrated display 180, mobile display 182 may include, for example, an LCD or PDP. Mobile display 182 can also include an interface that allows mobile display 182 to initiate communications with refrigerator appliance 100 over network 184.

Figure 4:
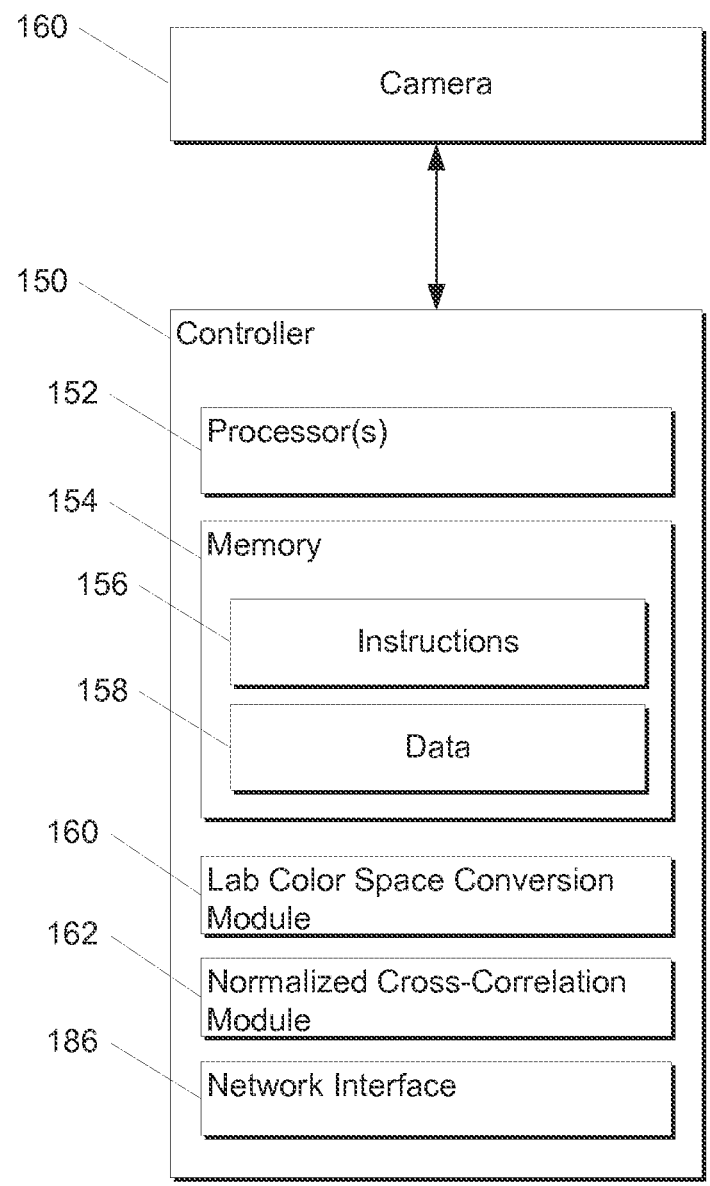
FIG. 4 provides a schematic view of a controller of the exemplary refrigerator appliance of FIG. 1.

FIG. 4 provides a schematic view of controller 150 and camera 160 of refrigerator appliance 100. With reference to FIGS. 3 and 4, camera 160 may collect a single image or a plurality of images of at least a portion of fresh food chamber 122 of refrigerator appliance 100. For example, in some embodiments, controller 150 may operate camera 160 to collect about thirty frames per second of a VGA resolution video stream. The frame rate can be modifiable by the controller 150.

Controller 150 can be any device that includes one or more processors 152 and a memory 154. As an example, in some embodiments, controller 150 may be a single board computer (SBC). For example, controller 150 can be a single System-On-Chip (SOC). Further, the camera 160 may also be located on the same single circuit board. However, any form of controller 150 may also be used to perform the present subject matter. The processor(s) 152 can be any suitable processing device, such as a microprocessor, microcontroller, integrated circuit, or other suitable processing devices or combinations thereof. The memory 154 can include any suitable storage media, including, but not limited to, non-transitory computer-readable media, RAM, ROM, hard drives, flash drives, accessible databases, or other memory devices. The memory 154 can store information accessible by processor(s) 152, including instructions 156 that can be executed by processor(s) 152 to perform aspects of the present disclosure.

Memory 154 can also include data 158. Data 158 can store various types of information. In some embodiments, data 158 can store a reference image of fresh food chamber 122 or a portion of a reference image of fresh food chamber 122. The reference image may correspond to an image including a plurality of optical fiducials 190 (FIGS. 5 and 8) and with refrigerator doors 128 in a specific position and/or orientation. As will be understood by those skilled in the art, the placement of optical fiducials 190 within images taken by camera 160 changes when refrigerator doors 128 are shifting between the open and closed positions. Thus, the reference image may provide a user of refrigerator appliance 100 with a desired view of fresh food chamber 122, e.g., such that images taken from the same perspective as the reference image allows the user to see the majority of food items in fresh food chamber 122. The reference image can be predetermined and loaded into memory 154 by the manufacturer of refrigerator appliance 100, or can be taken and stored in memory 154 during an initial calibration or set up of refrigerator appliance 100, such as when refrigerator appliance 100 is being installed.

Controller 150 may also include a number of modules to provide functionality or otherwise perform particular operations. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

In some exemplary embodiments, controller 150 includes a Lab color space conversion module 160. Lab color space conversion module 160 may convert RGB images taken with camera 160 into a Lab color space. As will be understood by those skilled in the art, Lab color space includes three planes or dimensions. An L plane that corresponds to or encodes luminosity; an A plane that corresponds to or encodes red-green color information; and a B plane that corresponds to or encodes blue-yellow color information. Any suitable formula or method may be used to convert RGB images taken with camera 160 into a Lab color space with Lab color space conversion module 160.

In some exemplary embodiments, controller 150 also includes a normalized cross-correlation module 162. Normalized cross-correlation module 162 may compare and cross-correlate between an image taken with camera 160 and a reference image in data 158 of memory 154. As will be understood by those skilled in the art, a normalized cross-correlation factor may assist with establishing a similarity of two images. Thus, normalized cross-correlation module 162 may generate a normalized cross-correlation factor between an image taken with camera 160 and the reference image in order to assist with determining whether refrigerator doors 128 are positioned and oriented in the same or similar manner in the image taken with camera 160 as in the reference image. For example, if a normalized cross-correlation factor calculated by normalized cross-correlation module 160 exceeds a predetermined value (e.g., 0.9), normalized cross-correlation module 160 may establish that refrigerator doors 128 are positioned and oriented in the same or similar manner in the image taken with camera 160 as in the reference image. Any suitable formula or method may be used to perform the normalized cross-correlation with normalized cross-correlation module 160.

In some exemplary embodiments, controller 150 also includes a network interface 186. Network interface 186 can include any circuitry or components for communication over network 184. For example, controller 150 can use network interface 186 to communicate with mobile display 182.

Network interface 186 may include transmitters, receivers, ports, controllers, antennas, or other suitable components for interfacing with network 184.

Figure 5:
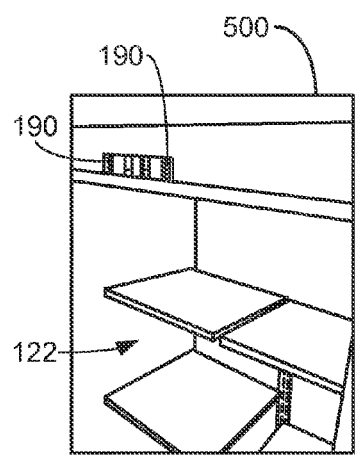
FIG. 5 provides an image of the fresh food chamber of the exemplary refrigerator appliance of FIG. 2 taken with a camera of the exemplary refrigerator appliance.
Figure 6:
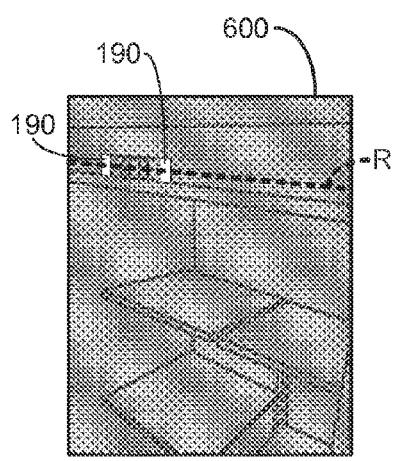
FIG. 6 provides an A plane image of a Lab color space of the image of FIG. 5.
Figure 7:
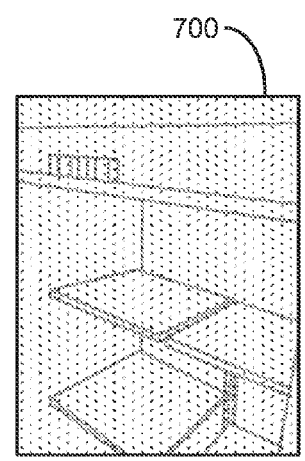
FIG. 7 provides an B plane image of the Lab color space of the image of FIG. 5.

FIG. 5 provides an image 500 of fresh food chamber 122 of refrigerator appliance 100 taken with camera 160. FIG. 6 provides an A plane image 600 of a Lab color space of the image 500. FIG. 7 provides a B plane image 700 of the Lab color space of the image 500. As may be seen in FIG. 5, refrigerator appliance 100 includes a plurality of optical fiducials 190. Optical fiducials 190 may be any suitable feature or component that provides a high contrast or saturation relative to other adjacent portions of refrigerator appliance 100. For example, housing 120 may have outer panels of stainless steel or enameled steel such that housing 120 has a polished steel outer finish, a white enamel finish, a black enamel finish, etc. As another example, housing 120 may have an inner plastic liner that defines fresh food chamber 122, and the inner plastic liner may have a white color. Optical fiducials 190 may have a color that has a high contrast or saturation relative to the outer panels and/or inner liner of housing 120, e.g., in at least one of the A or B plane of the Lab color space. For example, optical fiducials 190 may be blue, yellow, green or red. In the exemplary embodiment shown in FIGS. 6 and 7, optical fiducials 190 are red. Thus, optical fiducials 190 are clearly visible in the A plane image 600 of the Lab color space of the image 500, and optical fiducials 190 may be indistinguishable in the B plane image 700 of the Lab color space of the image 500.

Optical fiducials 190 may be any suitable mechanism for providing a contrast with adjacent portions of housing 120. For example, optical fiducials 190 may be stickers that are adhered to housing 120. As another example, optical fiducials 190 may be painted on housing 120. Optical fiducials 190 may be positioned on housing 120 at or adjacent top portion 101 of housing 120 such that optical fiducials 190 are covered by refrigerator doors 128 when refrigerator doors 128 are in the closed position. Conversely, optical fiducials 190 may also be positioned on housing 120 such that camera 160 sees and takes pictures of optical fiducials 190 when refrigerator doors 128 are in the open position, as shown in FIG. 5. It should be understood that optical fiducials 190 may be positioned at any other suitable location in alternative exemplary embodiments.

Figure 9:
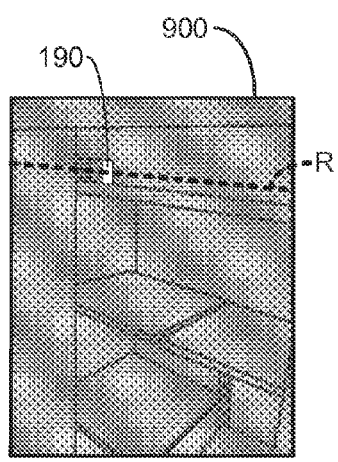
FIG. 9 provides the A plane image of the Lab color space of the image of FIG. 8.
Figure 10:
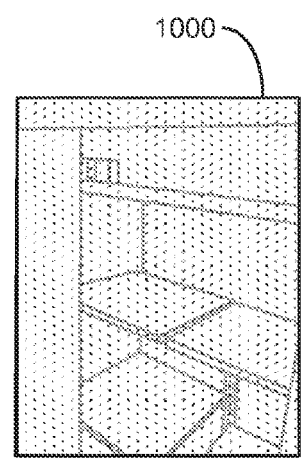
FIG. 10 provides the B plane image of the Lab color space of the image of FIG. 8.

FIG. 8 provides another image 800 of fresh food chamber 122 of refrigerator appliance 100 taken with camera 160. In FIG. 8, one of refrigerator doors 128 covers a respective one of optical fiducials 190. FIG. 9 provides the A plane image 900 of the Lab color space of image 800. FIG. 10 provides the B plane image 1000 of the Lab color space of image 800. In the exemplary embodiment shown in FIGS. 9 and 10, optical fiducials 190 are red. Thus, one of optical fiducials 190 is clearly visible in the A plane image 900 of the Lab color space of the image 800, and the one of optical fiducials 190 may be indistinguishable in the B plane image 1000 of the Lab color space of the image 800.

Figure 11:
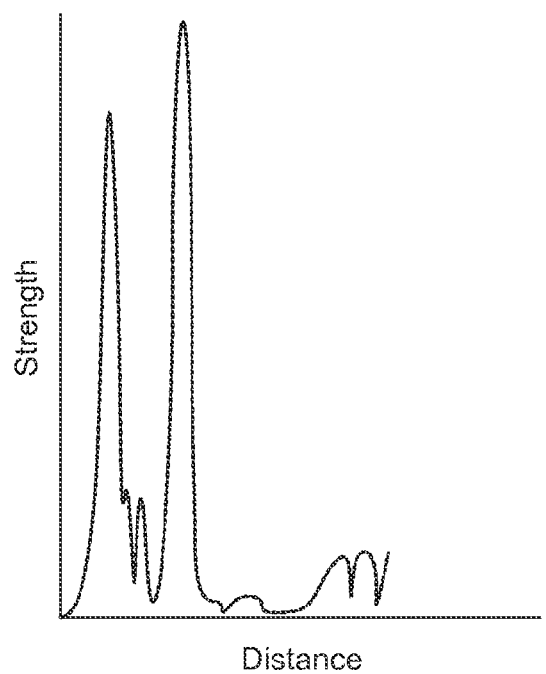
FIG. 11 provides a plot of a cross correlation between the A plane image of the Lab color space of FIG. 6 along a line R in FIG. 6 and a portion of a reference image.
Figure 12:
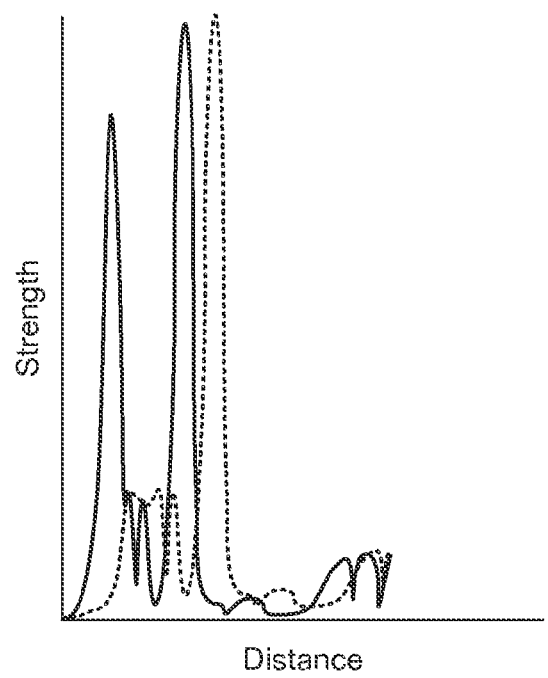
FIG. 12 provides a plot of a cross correlation between the A plane image of the Lab color space of FIG. 9 along the line R in FIG. 9 and the portion of the reference image.

FIG. 11 provides a plot of a normalized cross-correlation between a portion of the A plane image 500 along a line R and a portion of a reference image. FIG. 12 provides a plot of a normalized cross-correlation between the A plane image 900 along the line R and the portion of the reference image. In FIGS. 11 and 12, the solid lines are plots of an intensity or strength of the reference image along the line R versus a position along the line R, and the dashed lines are plots of the intensity or strength of the associated A plane image along the line R versus the position along the line R.

Figure 13:
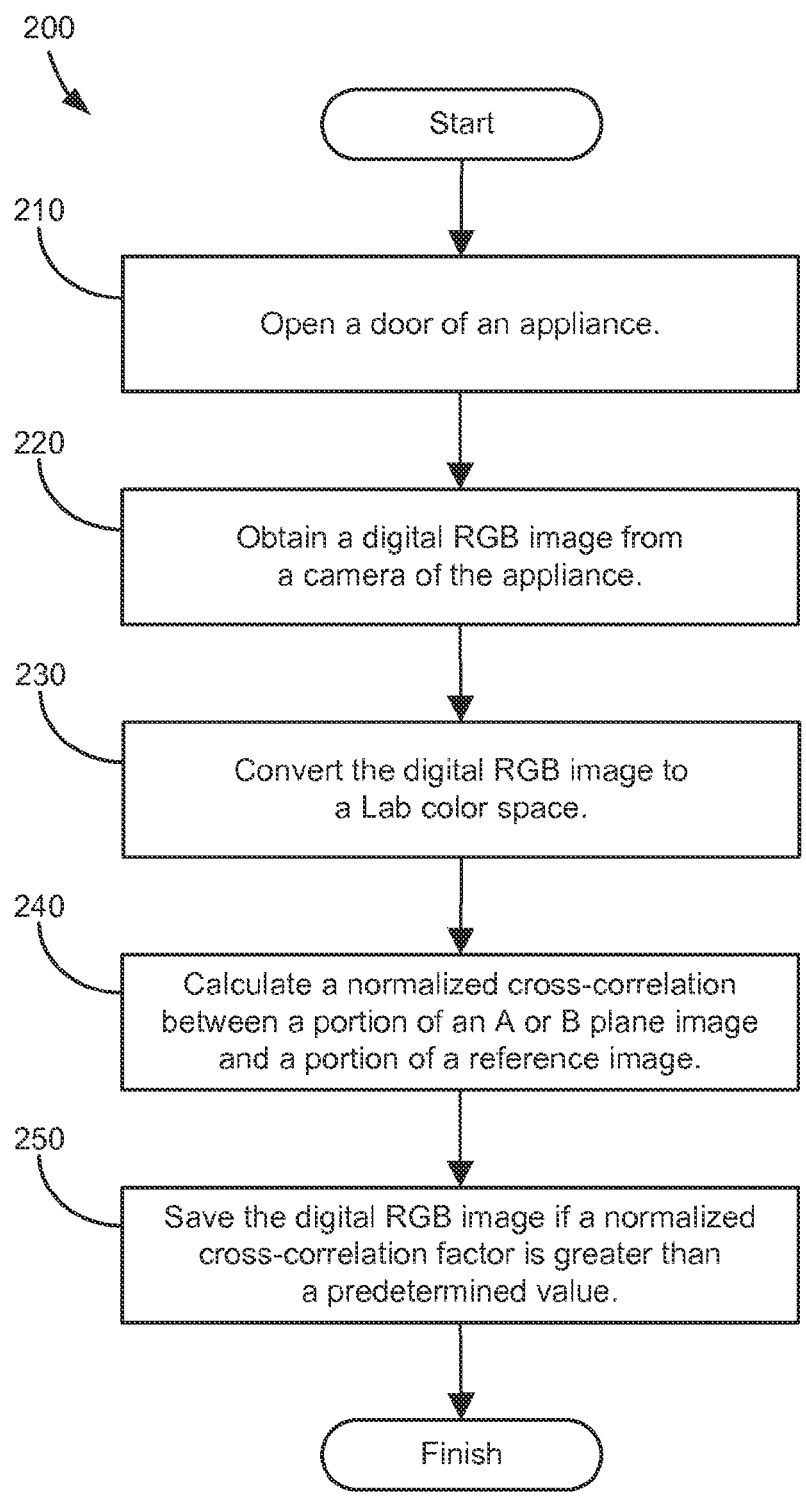
FIG. 13 illustrates a method for selecting an image of an appliance with a suitable position or orientation of a door of the appliance according to an exemplary embodiment of the present subject matter.

FIG. 13 illustrates a method 200 for selecting an image of an appliance with a suitable position or orientation of a door of the appliance according to an exemplary embodiment of the present subject matter. Method 200 may be used with assist with selecting images of any suitable appliance. For example, method 200 may be used to select an image of refrigerator appliance 100 with refrigerator doors 128 in a suitable position or orientation. Thus, method 200 is discussed in greater detail below in the context of refrigerator appliance 100 and with reference to the images shown in FIGS. 5-10 and the normalized cross-correlations shown in FIGS. 11 and 12. Controller 150 may be programmed or configured to implement various steps or portions of method 200.

At step 210, refrigerator doors 128 of refrigerator appliance 100 are opened. For example, a user of refrigerator appliance 100 may pull on handles of refrigerator doors 128 to open refrigerator doors 128 at step 210. As another example, the user may open only one of refrigerator doors 128 at step 210.

At step 220, a digital RGB image from camera 160 of refrigerator appliance 100 is obtained. For example, controller 150 may receive a signal from camera 160 corresponding to the digital RGB image from camera 160 at step 220. Camera 160 may take or capture the digital RGB image during step 210. Thus, while (e.g., or each time) the user of refrigerator appliance 100 is opening refrigerator doors 128, camera 160 may take or capture the digital RGB image. It should be understood that multiple digital RGB images may be captured with camera 160 during step 210. As an example, as refrigerator doors 128 are opened at step 210, camera 160 may take or capture image 500 (FIG. 5) at step 220. As another example, when one of refrigerator doors 128 is opened at step 210, camera 160 may take or capture image 800 (FIG. 8) at step 220.

As may be seen in FIGS. 5 and 8, the digital RGB image from camera 160 taken at step 220 may include at least one of optical fiducials 190 therein. In particular, turning to FIG. 5, refrigerator doors 128 are both in the open position and both of optical fiducials 190 are visible to camera 160 and shown in the image 500. Conversely, turning to FIG. 8, one of refrigerator doors 128 is in the open position and only one of optical fiducials 190 is visible to camera 160 and shown in the image 800.

At step 230, the digital RGB image from step 220 is converted to a Lab color space. For example, controller 150 may convert the digital RGB image from step 220 into at least one of in an A plane image or a B plane image at step 230. In particular, if optical fiducials 190 are red or green, controller 150 may convert the digital RGB image from step 220 into the A plane image at step 230. Conversely, if optical fiducials 190 are blue or yellow, controller 150 may convert the digital RGB image from step 220 into the B plane image at step 230.

As may be seen in FIGS. 6 and 9, at least one of optical fiducials 190 may be visible in the A plane image generated at step 230 because optical fiducials 190 are red. In particular, turning to FIG. 6, both of optical fiducials 190 are visible in the A plane image 600 because both of refrigerator doors 128 are open. Conversely, as shown in FIG. 9, only one of optical fiducials 190 is visible in the A plane image 900 because only one of refrigerator doors 128 is open.

At step 240, a normalized cross-correlation between a portion of the A plane image or the B plane image generated at step 230 and a portion of a reference image is calculated. For example, controller 150 may calculate a normalized cross-correlation factor between a line of an A plane image or a B plane image generated at step 230 and a line of a reference image at step 240. In particular, controller 150 may calculate the normalized cross-correlation factor between the line of the A plane image at step 240 if optical fiducials 190 are red or green. Conversely, controller 150 may calculate the normalized cross-correlation factor between a line of the B plane image at step 240 if optical fiducials 190 are blue or yellow.

As discussed above, the reference image may correspond to an image including optical fiducials 190 with refrigerator doors 128 in a particular arrangement or configuration. The particular arrangement or configuration may be selected such that a majority or desired portion of fresh food chamber 122 is visible in images taken with camera 160 in the particular arrangement or configuration. Thus, when the normalized cross-correlation factor calculated at step 240 exceeds a predetermined value, refrigerator doors 128 are in the same or similar arrangement or configuration in an image taken with camera 160 that is cross correlated with the reference image at step 240. In such a manner, controller 150 may select or identify suitable images of fresh food chamber 122 by comparing (e.g., a portion of) an image from camera 160 with (e.g., a portion of) the reference image.

Plots of normalized cross-correlations, such as may be performed by controller 150 at step 240, are illustrated in FIGS. 11 and 12. In FIG. 11, the normalized cross-correlation is between the portion (e.g., pixels) of the A plane image 600 along a line R and the portion of the reference image taken along a corresponding line. In FIG. 12, the normalized cross-correlation is between the portion (e.g., pixels) of the A plane image 900 along the line R and the portion of the reference image taken along the corresponding line. For the normalized cross-correlation shown in FIG. 11, a normalized cross-correlation factor is 0.994, and the normalized cross-correlation factor is −0.0817 for the normalized cross-correlation shown in FIG. 12. Thus, the normalized cross-correlation factor between the portion of the A plane image 600 along the line R and the portion of the reference image taken along the corresponding line indicates or suggests that refrigerator doors 128 are in the same or similar position and/or orientation in the image 500 as the reference image. Conversely, the normalized cross-correlation factor between the portion of the A plane image 900 along the line R and the portion of the reference image taken along the corresponding line indicates or suggests that refrigerator doors 128 are not in the same or similar position and orientation in the image 800 as the reference image. As discussed above, one of refrigerator doors 128 is closed in FIG. 8 such that the one of refrigerator doors 28 obstructs one of optical fiducials 190 and fresh food chamber 122.

At step 250, the digital RGB image from step 220 is saved if the normalized cross-correlation factor from step 240 exceeds a predetermined value. Thus, controller 150 may save the digital RGB image from step 220 in memory 154 of controller 150 if the normalized cross-correlation factor from step 240 exceeds the predetermined value. The predetermined value may be any suitable value. For example, the predetermined value may be at least six tenths, at least seventy-five hundredths, etc. In such a manner, controller 150 may save the digital RGB image from step 220 if refrigerator doors 128 are in the same or similar position as in the reference image.

Method 200 may also include retrieving the digital RGB image from the memory 154 of controller 150 and presenting or displaying the digital RGB image to a user of refrigerator appliance 100. For example, controller 150 may send the digital RGB image to mobile display 182 via network 184 and allow the user to view the digital RGB image on mobile display 182. In such a manner, the user of refrigerator appliance 100 may e.g., view the contents of fresh food chamber 122 remotely. As another example, controller 150 may send the digital RGB image to integrated display 180 and allow the user to view the digital RGB image on integrated display 180. In such a manner, the user of refrigerator appliance 100 may e.g., view the contents of fresh food chamber 122 without opening refrigerator doors 128.

It should be understood that while described in the context of conversion to the Lab color space, any suitable device independent color space that separates device dependent color into lightness and chromatic primary planes may be used with method 200. Thus, the present subject matter may be used with any suitable device independent color space to identify optical fiducials 190 within at least one of the chromatic primary planes of the device independent color space in the manner described above for the Lab color space. For example, method 200 may utilize any suitable device independent color space from the International Commission on Illumination (CIE) family of device independent color spaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for selecting an image of an appliance with a suitable position or orientation of a door of the appliance:
  obtaining, by the controller, a digital RGB image from a camera of the appliance while the door of the appliance is opening, the camera positioned on the door of the appliance, the digital RGB image including a plurality of optical fiducials positioned on the appliance, each optical fiducial of the plurality of optical fiducials colored one of red, green, yellow and blue;
  converting, by the controller, the digital RGB image from said step of obtaining to a Lab color space in order to generate at least one of an A plane image or a B plane image from the digital RGB image, the A plane image is generated at said step of converting if one of the plurality of optical fiducials is red or green and the B plane image is generated at said step of converting if one of the plurality of optical fiducials is yellow or blue;
  calculating, by the controller, a normalized cross-correlation between a portion of the A or B plane images from said step of converting and a portion of a reference image, the door being at a reference position in the reference image, said step of calculating comprising calculating the normalized cross-correlation between a line of the A plane image from said step of converting and a line of the reference image if one of the plurality of optical fiducials is red or green and calculating the normalized cross-correlation between a line of the B plane image from said step of converting and the line of the reference image if one of the plurality of optical fiducials is yellow or blue; and saving, by the controller, the digital RGB image from said step of obtaining when a normalized cross-correlation factor from said step of calculating is greater than a predetermined value.

2. The method of claim 1, wherein each optical fiducial of the plurality of optical fiducials is colored one of red, green, yellow and blue.

3. The method of claim 1, further comprising retrieving the digital RGB image after said step of saving and presenting the digital RGB image to a user of the appliance on a display.

4. The method of claim 1, wherein the appliance is a refrigerator appliance having a cabinet that defines a freezer chamber and a fresh food chamber, the camera positioned on a fresh food door of the refrigerator appliance, the plurality of optical fiducials positioned on the cabinet of the refrigerator appliance adjacent the fresh food chamber.

5. A method for selecting an image of an appliance with a suitable position or orientation of a door of the appliance, comprising:
  obtaining, by a controller, a plurality of digital RGB images from a camera of the appliance while the door of the appliance is opening, the camera positioned on the door of the appliance, at least one digital RGB image of plurality of digital RGB images including a plurality of optical fiducials positioned on the appliance, each optical fiducial of the plurality of optical fiducials colored one of red, green, yellow and blue;
  converting, by the controller, each digital RGB image of the plurality of digital RGB images from said step of obtaining to a device independent color space in order to generate an first chromatic primary plane image or a second chromatic primary plane image from each digital RGB image of the plurality of digital RGB images, the device independent color space is a Lab color space, the first chromatic primary plane image is an A plane image, and the second chromatic primary plane image is a B plane image, the A plane image generated at said step of converting if one of the plurality of optical fiducials is red or green and the B plane image generated at said step of converting if one of the plurality of optical fiducials is yellow or blue;
  calculating, the controller, a normalized cross-correlation between a portion of the first or second chromatic primary plane images from said step of converting and a portion of a reference image, the door being at a reference position in the reference image, said step of calculating comprising calculating the normalized cross-correlation between a line of the A plane image from said step of converting and a line of the reference image if one of the plurality of optical fiducials is red or green and calculating the normalized cross-correlation between a line of the B plane image from said step of converting and the line of the reference image if one of the plurality of optical fiducials is yellow or blue; and
  selecting, by the controller, a particular one of the plurality of digital RGB images, the particular one of the plurality of digital RGB images having a normalized cross-correlation factor from said step of calculating that is greater than a predetermined value.

6. The method of claim 5, wherein said step of calculating comprises calculating the normalized cross-correlation between a line of the first or second chromatic primary plane images from said step of converting and a line of the reference image.

7. The method of claim 5, further comprising saving the particular one of the plurality of digital RGB images in a memory of the appliance.

8. The method of claim 7, further comprising retrieving the digital RGB image after said step of saving and presenting the digital RGB image to a user of the appliance on a display.

9. The method of claim 5, wherein the appliance is a refrigerator appliance having a cabinet that defines a freezer chamber and a fresh food chamber, the camera positioned on a fresh food door of the refrigerator appliance, the plurality of optical fiducials positioned on the cabinet of the refrigerator appliance adjacent the fresh food chamber.

10. The method of claim 9, wherein each of the plurality of optical fiducials comprises a sticker adhered to the cabinet.

11. The method of claim 9, wherein the optical fiducials are fixed at a top portion of the cabinet.

* * * * *